Nov. 15, 1949  A. G. FORSYTH  2,488,392
ELECTRICAL EQUIPMENT ON AIRCRAFT
Filed Nov. 12, 1946  4 Sheets-Sheet 1
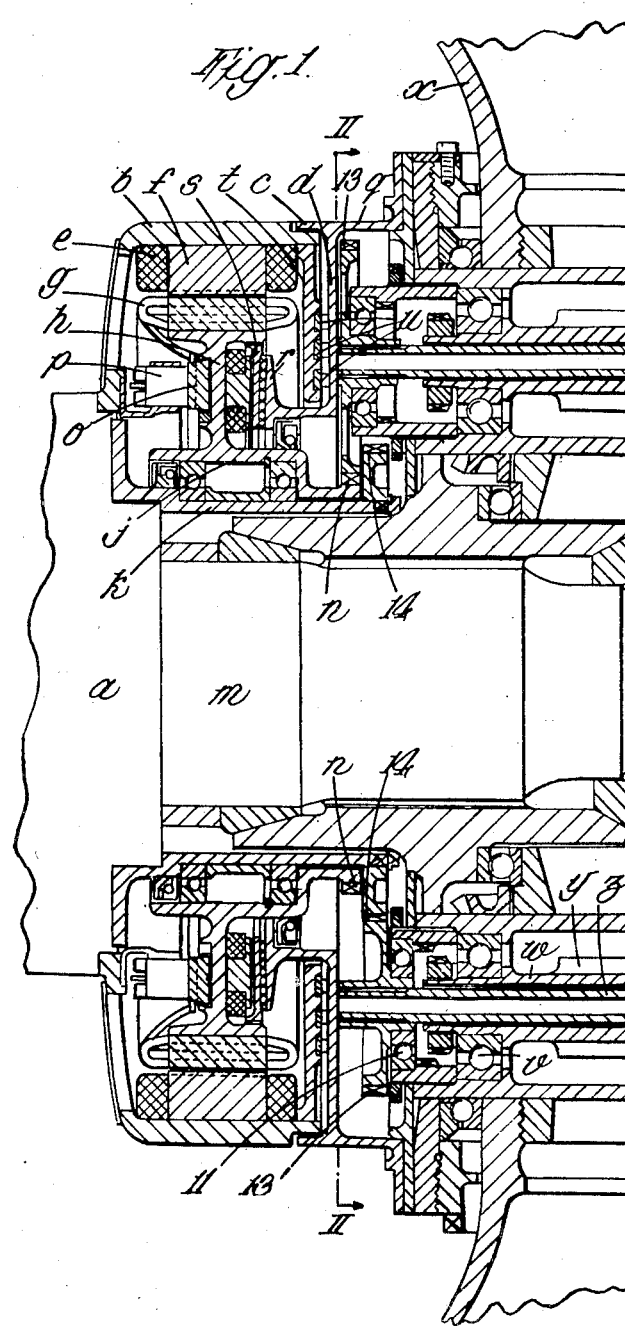
INVENTOR
ARCHIBALD GRAHAM FORSYTH,
BY Robert B Larson.
ATTORNEY

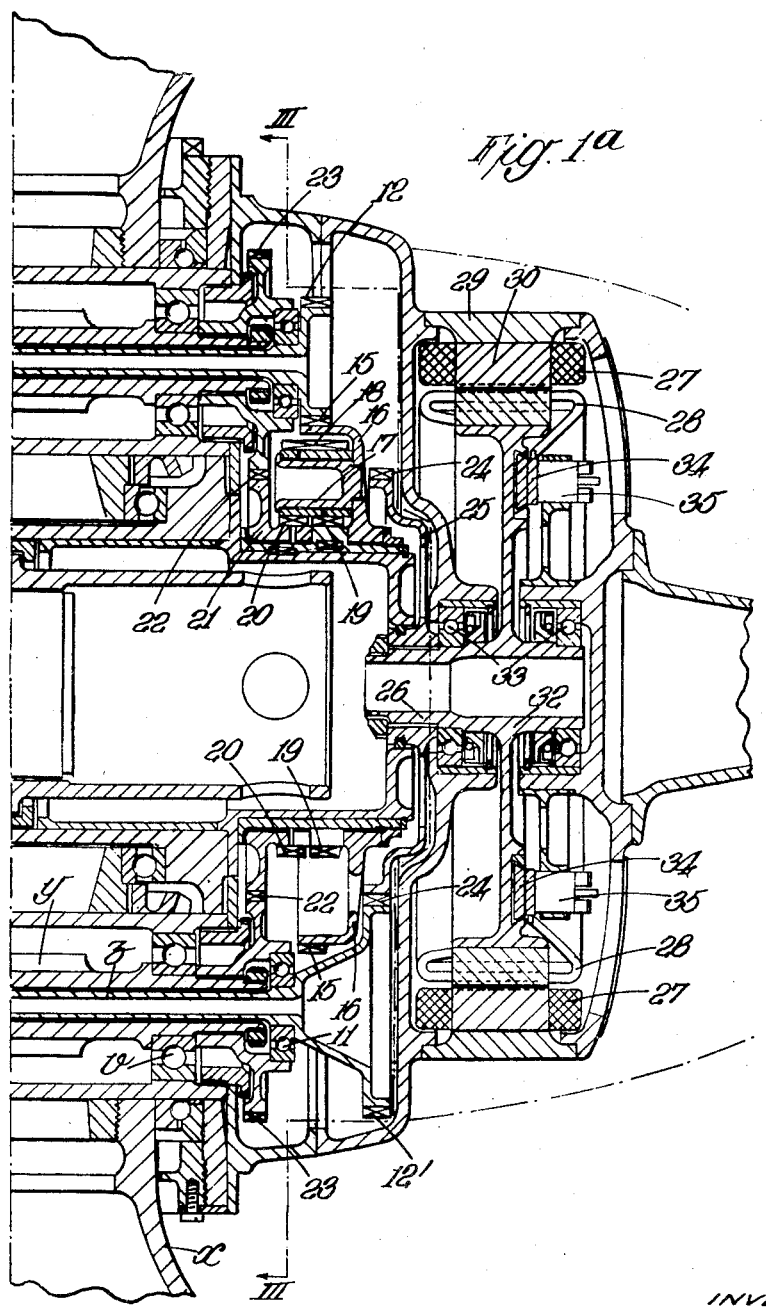

Nov. 15, 1949  A. G. FORSYTH  2,488,392
ELECTRICAL EQUIPMENT ON AIRCRAFT
Filed Nov. 12, 1946  4 Sheets-Sheet 3
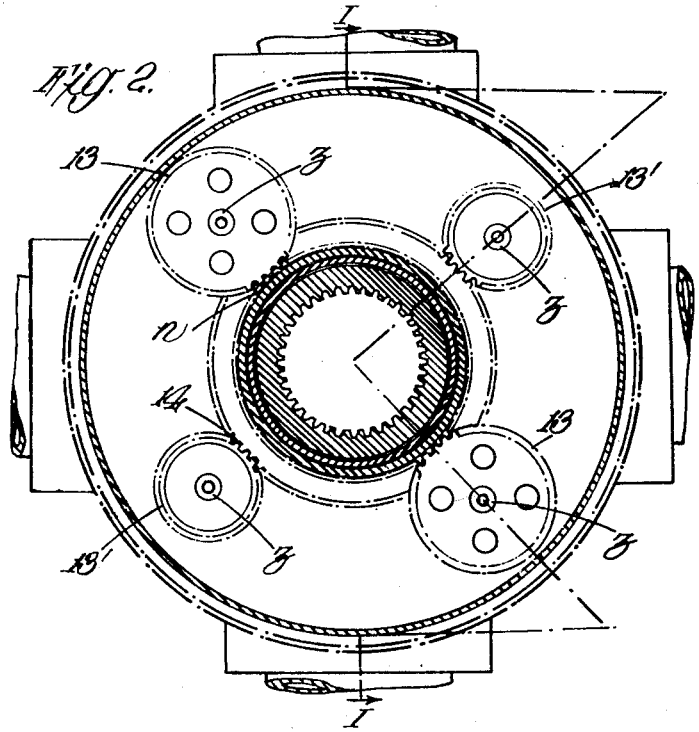
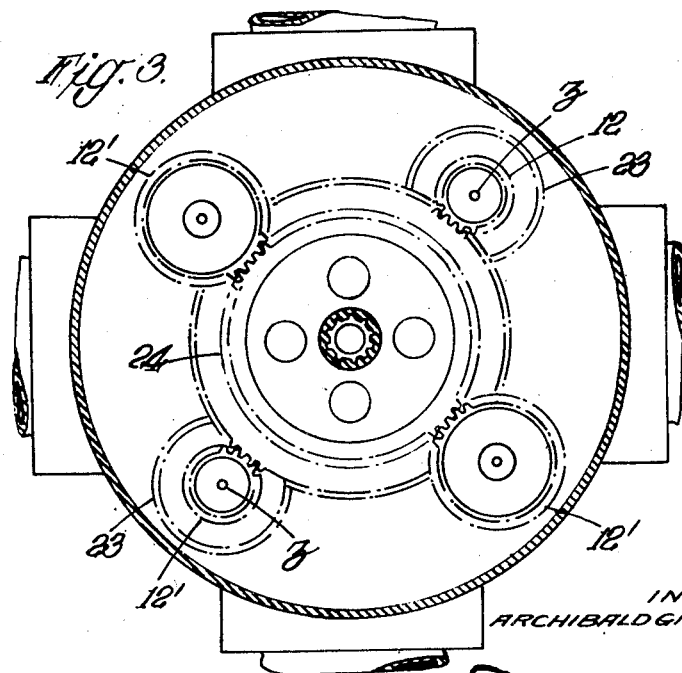
INVENTOR
ARCHIBALD GRAHAM FORSYTH,
BY
Robert B. Pearson
ATTORNEY Nov. 15, 1949　　　　A. G. FORSYTH　　　　2,488,392
ELECTRICAL EQUIPMENT ON AIRCRAFT
Filed Nov. 12, 1946　　　　　　　　　　　　4 Sheets-Sheet 4
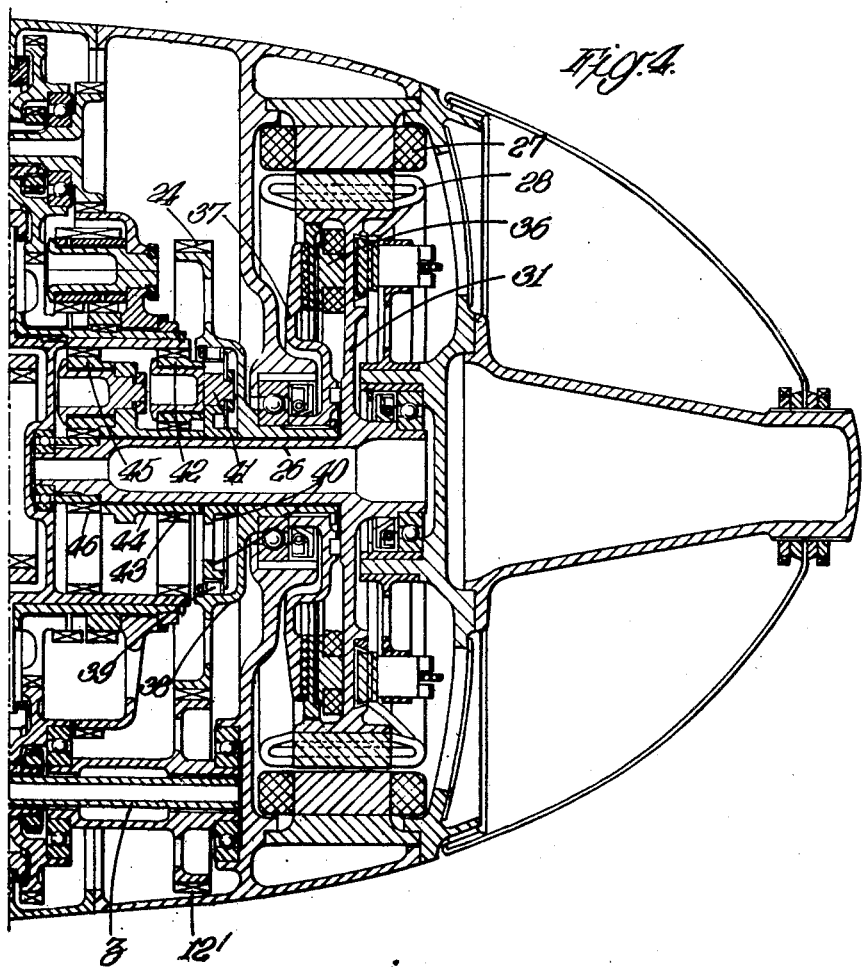
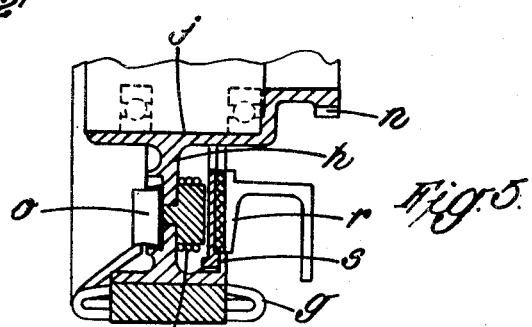
INVENTOR
ARCHIBALD GRAHAM FORSYTH,
BY Robert B. Larson
ATTORNEY Patented Nov. 15, 1949

2,488,392

UNITED STATES PATENT OFFICE 2,488,392

ELECTRICAL EQUIPMENT ON AIRCRAFT

Archibald Graham Forsyth, Cheam, England, assignor to The Fairey Aviation Company Limited, Hayes, England Application November 12, 1946, Serial No. 709,355
In Great Britain August 21, 1945

8 Claims. (Cl. 170—160.23)

This invention relates to electrical equipment on aircraft, having self-contained electrical units for association with variable pitch propellers to provide means for varying the pitch of the propeller blades and to generate current for electrical de-icing devices for the blades and spinner of such a propeller and for heating, lighting and other purposes on the aircraft. Such electrical equipment is described and claimed in applicant's co-pending application for Letters Patent, Serial No. 630,407, filed November 23, 1945, according to which an aircraft engine has the field coils and brush gear of a dynamo electric machine mounted on its front end, the armature of said machine being arranged to be freely rotatable about the propeller shaft, and a magnetic clutch is arranged between the armature and the propeller hub, the magnetic clutch being adapted to cause the armature to rotate as one with the propeller hub and also to serve as a brake when the dynamo electric machine is used as a motor for pitch changing purposes. In such an arrangement the armature of the dynamo electric machine may be carried by a spider, and sun and planet gearing for pitch changing purposes may be arranged within a casing extending rearwardly from, and coaxially with, the propeller hub, the magnetic clutch being arranged between the spider and casing and the spider having a toothed sleeve extending coaxially into the casing to serve as a sun wheel for operation of the sun and planet gear therein. The pitch changing mechanism including, for each blade, a worm wheel around the root of the blade, a worm on a shaft tangential to the blade root and a gear wheel at one end of said shaft, may be driven by gearing comprising a spider carrying planet wheels meshing with the sun wheel on the armature carrying spider and also with internal teeth in the gear casing, planet wheels freely rotatable on spindles carried by the planet-wheel carrying spider and meshing with a fixed sun wheel and with a freely rotatable sun wheel, side by side therewith, which has more teeth than the fixed sun wheel and has an extension carrying a gear wheel meshing with the gear wheels on the pitch-changing worm shafts. The arrangement disclosed in the specification accompanying the said co-pending application for Letters Patent is such that the armature is rotated at propeller speed. This is satisfactory in cases where the propeller rotates at high speed, but as there is a general tendency towards the reduction of propeller speeds and the increase of current consumption, necessitating considerable increase in the weight of the generator, another arrangement is described in the specification accompanying applicant's co-pending application for Letters Patent, Serial No. 680,896, filed July 2, 1946, in which the introduction of a high speed drive enables the weight of, and the space required to house, the apparatus to be reduced. This is accomplished by mounting the field coils and brush gear of the dynamo electric machine on the front end of the aircraft engine while the armature of said machine is arranged to be rotatable freely about the axis of the propeller shaft and to be driven from, and at a higher speed than, the propeller shaft through intermediate gearing. In an arrangement as just mentioned, the armature may be formed integral with a sun wheel meshing with planet wheels on spindles carrying planet pinions meshing with a sun wheel keyed to the propeller shaft, while, in a modification thereof the sun wheel with which the planet pinions mesh may be arranged to be connected with, or disconnected from, the propeller shaft by a magnetic clutch and it may carry further planet pinions meshing with two sun wheels one of which is rotatable as one with the propeller shaft and the other of which is rotatable freely about the propeller shaft, has more teeth than its companion, and is integral with a gear wheel coaxial with the propeller shaft and meshing with pinions forming parts of pitch changing mechanism for the blades of the propeller.

The object of the present invention is a still further improved self-contained electrical unit which will be independent of any source of electrical energy except for starting purposes to which end, and in accordance with this invention, the arrangement comprises two dynamo electric machines, one in front, and the other behind, the propeller hub, the two machines, between themselves, being capable of providing all the current required, except for starting purposes.

The dynamo electric machine in front of the propeller hub may be driven, to act as a generator, from a fixed sun wheel in rear of the hub by means of a sun wheel rotatable as one with its armature and freely with respect to the propeller shaft by a pinion on the front end of a shaft passing coaxially through a pitch-changing worm shaft and having on its rear end a second pinion meshing with said fixed sun wheel. Preferably, for balancing purposes, there would be at least two such shafts, symmetrically arranged for driving the front dynamo electric machine. The direction of the drive for this machine is dependent on the relative sizes of the fixed sun wheel and the sun wheel which rotates as one with the armature, for, if the fixed sun wheel be smaller than the other the armature will be revolved in the same direction as the hub, but, if it be larger the armature will be revolved in the opposite direction to the hub, thus allowing a high armature speed to be attained.

The dynamo electric machine in rear of the hub may serve as a motor for pitch changing purposes through mechanism similar to that disclosed in the above mentioned co-pending application for Letters Patent Serial No. 630,407, but for the purposes of the present invention the planet-wheel-carrying spider and the fixed and freely rotatable sun wheels are arranged in front of the hub and motion is transmitted to pinions at the rear ends of the pitch-changing worm shafts by one or more shafts passing through one or more of the pitch-changing worm shafts similar to those for driving the front dynamo electric machine.

In a modification of the present invention the front dynamo electric machine may be used also as a motor for starting purposes, in which event, a clutch is provided between its armature and the sun wheel by which it is driven for generating purposes. This clutch is arranged to couple the sun wheel mechanically with the armature and electrically to de-clutch it therefrom and, as before, the sun wheel meshes with at least one of the planet wheels on the shafts passing through the pitch-changing worm shafts and in addition a pinion on the armature shaft may be arranged to drive said sun wheel through double epi-cyclic gearing and a uni-directional device.

Normally the clutch effects a mechanical connection between the sun wheel and the armature so that the latter may be driven for generating purposes as hereinbefore set forth, the sun wheel running round on the uni-directional device. When however the armature is connected with an external source of energy, the clutch is disconnected electrically and the sun wheel is driven through the pinion on the armature shaft, the double epi-cyclic gearing, and the uni-directional device, and in turn rotates the pinions on the front ends of the shafts which pass through the pitch-changing worm shafts, the pinions on the rear ends of which are thus rotated and roll round on the fixed sun wheel with which they mesh causing the hub as a whole to be turned.

If it be desired to provide a fan for cooling purposes this may be done by arranging the fan coaxially to surround the casing of the rear dynamo electric machine and providing its rotor with an internally toothed gear ring meshing with the pinions at the rear ends of those of the shafts which pass through the pitch-changing worm shafts which are employed for driving the front dynamo electric machine as a generator.

One form of the invention is illustrated by the accompanying drawings, in which:

Figures 1 and 1a are a section, substantially on the line I—I, Figure 2,

Figure 2 is a cross-section on the line II—II, Figures 1 and 1a,

Figure 3 is a cross-section on the line III—III, Figures 1 and 1a,

Figure 4 is a fragmentary axial section illustrating a modification including starting gear, and Figure 5 is a fragmentary axial section illustrating a detail.

As shown in Figures 1 and 1a to 3, especially Figure 1, there is secured coaxially on the nose $a$ of an aircraft engine a cylindrical casing $b$ of small axial length, open at its front end and arranged to fit freely into a coaxial flange $c$ projecting rearwardly from a plate $d$ forming part of the propeller hub. At the inner periphery of the casing the field coils $e$ of a dynamo electric machine are wound on cores $f$. The armature $g$ of the dynamo electric machine is wound on the peripheral flange of a substantially H-section spider $h$ the inner peripheral flange $j$ of which constitutes a sleeve rotatable on a fixed part such as an extension $k$ of the oil seal cover mounted on the engine and through which the propeller shaft $m$ passes coaxially. The rotatable sleeve $j$ extends forwardly into the hub structure and is formed as a sun wheel $n$. The web of the H-section armature rotor $h$ carries at its rear side a commutator $o$ to co-operate with brushes $p$ carried by the wall at the rear end of the cylindrical casing $b$.

Mounted at the rear of the propeller hub is a cylindrical gear casing $q$ (which is in effect a forward projection from the plate $d$) which rotates as one with said hub and part $r$ of which projects rearwardly into the annulus presented at the front of the H-section armature rotor $h$. Between the rear end of this projecting part $r$ of the gear casing $q$ and the web of the H-section armature rotor $h$ is arranged a magnetic clutch the face plate $s$ of which is urged towards its free position by springs (not shown).

Between an annular plate $t$ carried by the cylindrical casing $b$ and the plate $d$ are slip ring contacts $u$ . . for the various electric connections.

Within the hub structure are arranged in ball bearings $v$ four tubular pitch-changing worm shafts $w$ extending tangentially with respect to the roots of four propeller blades $x$ . . . , the worms $y$ on the shafts $w$ meshing with worm wheels (not shown) formed around said roots, and through these tubular shafts $w$ extend inner shafts $z$, which, for convenience, will be referred to as the through shafts. These through shafts $z$ which project forwardly and rearwardly beyond the ends of the tubular pitch-changing shafts $w$, are likewise mounted in ball bearings 11. Two of the shafts $z$ have pinions 12, at their front ends and pinions 13, at their rear ends and the other two have pinions 12' at their front ends and pinions 13' at their rear ends, the pinions 13 at the rear ends of two diametrically opposite through shafts $z$ meshing with the sun wheel $n$ formed on the forward extension of the inner peripheral flange or rotatable sleeve $j$ of the H-section armature rotor $h$, as shown in the upper half of Figures 1 and 1a and in Figure 2, and the pinions 13' at the rear ends of the two other diametrically opposite through shafts $z$ meshing with a fixed sun wheel 14 on fixed parts such as the extension $k$ of the oil seal cover mounted on the engine, as shown in the lower half of Figures 1 and 1a and in Figure 2. For convenience this fixed sun wheel 14 will be called the principal fixed sun wheel.

The pinions 12 at the front ends of the first mentioned pair of through shafts $z$ mesh with a sun wheel 15 formed on a spider 16, as shown in the upper half of Figures 1 and 1a and in Figure 3. The spider 16 is free to revolve on an extension of the hub and carries three rearwardly extending stub spindles such as 17 spaced at 120° intervals, one of the stub spindles 17 being shown in the upper half of Figures 1 and 1a. On these stub spindles 17 are rotatably mounted planet pinions such as 18 the teeth of which are wide enough to mesh with two sun wheels 19 and 20 arranged side by side. One 19 of these two sun wheels is keyed to the extension of the hub and the other 20 is freely rotatable thereon, has three more teeth thereon than the fixed sun wheel 19, although the teeth of both sun wheels 19 and 20 are cut on the same pitch circle, and has a rearward projection 21 formed with external teeth constituting a sun wheel 22 which mesh with gear wheels 23 on the front ends of the four tubular shafts $w$. By these means pitch changing may be effected by the rear dynamo electric machine $e$, $g$ in a manner corresponding with that set forth in the above-mentioned co-pending application for Letters Patent, Serial No. 630,407.

When the pitch changing operation has been performed and the rear dynamo electric machine $e$, $g$ is no longer used as a motor, and current is cut off therefrom, the clutch $s$ couples its armature $g$ with the part $r$ of the gear casing $q$, i. e. with the hub structure, under the influence of equiangularly spaced springs such as $s'$ Figure 5, all the gearing is static and the propeller blades $x$ ... are locked. The section shown in Figure 5 is taken on a different radial plane from either of those on which Figure 1 is taken. The armature $g$ is thus revolved and said machine acts as a generator.

The pinions 12' at the front ends of the second mentioned pair of through shafts $z$ mesh with a sun wheel 24 formed on a spider 25 fast on the spindle 26 of the front dynamo electric machine 27, 28. This machine 27, 28 is to be used only as a generator and its casing 29, which is integral with the propeller hub, has, at its inner periphery, field coils 27 wound on cores 30. The armature 28 of this machine is wound on the peripheral flange of a substantially H-section spider 31 the inner peripheral flange of which forms part of the spindle 26 and constitutes a sleeve 32 rotatable in bearings 33 in the front ends of the casing 29 and in the hub structure, the spider 25 carrying the sun wheel 24 by which the armature 28 may be driven being keyed to the rear end 26 of the sleeve 32. The web of the H-section armature rotor 31 carries at its front side a commutator 34 co-operating with brushes 35 carried by the casing of the machine. When the propeller hub is rotated the pinions 13' at the rear ends of the appropriate pair of through shafts $z$ are carried bodily around the principal fixed sun wheel 14 with which they mesh thus rotating said through shafts $z$, the pinions 12' at the front ends of those through shafts, the sun wheel 24 on the spindle of the armature 28 of the front dynamo electric machine and hence the armature 28 itself; thus as long as the propeller is rotated the machine 27, 28 generates current. If the principal fixed sun wheel 14 be of smaller diameter than the sun wheel 24 on the armature spindle the armature 28 will be driven in the same direction as the hub, but if, as shown, it be of greater diameter, the armature 28 will be driven in the opposite direction to the hub, i. e. opposite to the direction in which its brushes 35 are revolved, hence a very high armature speed can be attained and a high speed generator can be used, thus reducing the weight.

For de-icing purposes heating elements (not shown) are arranged at the leading edges of the propeller blades and in the spinner and current is transferred from slip rings such as $u$. . in the structures of the dynamo electric machines, two blades, per machine. Slip rings $u$. . are shown in association with the rear dynamo electric machine $e$, $g$ but are not shown in association with the front dynamo electric machine 27, 28. The arrangement, however, would be similar.

When so arranged the front dynamo electric machine 27, 28 will provide the current required to de-ice two propeller blades, the current for driving the rear dynamo electric machine $e$, $g$ and will act as a motor for constant speed governing and for reverse pitch operation.

In the modified form of the invention illustrated by Figure 4 the front dynamo electric machine 27, 28 is arranged for use not only as a generator, but also as a motor for starting purposes. In this modification the rear dynamo electric machine and its associated parts are arranged as hereinbefore set forth, and, therefore, need not be shown. A normally mechanically closed clutch 36 which may be de-clutched electrically is arranged between the rotor 31 of the armature 28 of the front dynamo machine 27, 28 and a spider 37 rotatable on the armature spindle 26 but fast on the shaft of the sun wheel 24 by which said rotor is driven from the pinions 12' on the front ends of through shafts $z$, the sun wheel 24 is formed with a cylindrical hub 38 in which is disposed a uni-directional mechanism 39 having an inner member 40 rotatable on the armature spindle 26 and carrying stub spindles such as 41 for a set of planet pinions such as 42 meshing with gear teeth 43 on a sleeve 44 also rotatable on the spindle 26. The sleeve 44 carries a second set of planet pinions 45 meshing with a pinion 46 on the armature spindle 26. When, therefore, the front dynamo electric machine 27, 28 is energized as a motor the clutch 36 is released, the pinion 46 on its spindle 26 drives the double epi-cyclic gearing and, through the unidirectional mechanism 39, the sun wheel 24 which, normally, is clutched to the armature 28 of said machine, but which now drives the pinions 12' on the front ends of two of the through shafts $z$. This causes the pinions 13' (Figure 1) at the rear ends of said through shafts $z$ to be rotated and to roll round on the principal fixed sun wheel 14, thus turning the hub and propeller shaft to start the engine.

I claim:

1. Electrical equipment for aircraft having rotatable propeller blades equipped with pitch changing mechanism and mounted in a propeller hub, comprising, a first dynamo electric machine positioned at the rear of the propeller hub and having a rotor and stator, a second dynamo electric machine carried by a forward portion of the hub and having a field coil element and an armature element, first drive means extending in an axial direction in the hub for connecting the rotor of said first dynamo electric machine to the pitch changing mechanism to bring about pitch changes, clutch means for causing rotation of said rotor with the propeller hub to operate said first machine as a generator, a fixed gear on the aircraft, means mounting one element of said second machine for rotation with the propeller hub, and second drive means extending in an axial direction in the hub and rotatable by movement with the hub about said fixed gear for driving the other element of said second machine relatively to the first element to generate electricity.

2. Electrical equipment for aircraft, as set forth in claim 1, in which said pitch changing mechanism includes worm shafts carried by the hub and located tangentially to the blades, said drive means comprising shafts extending coaxially through said worm shafts.

3. Electrical equipment for aircraft having rotatable propeller blades mounted in a propeller hub and equipped with pitch changing mechanism including worm shafts carried by the hub and located tangentially to the blades, comprising, a first dynamo electric machine positioned at the rear of the propeller hub and having a rotor and stator, a second dynamo electric machine carried by a forward portion of the hub and having a field coil element and an armature element, first drive means comprising shafts extending coaxially through said worm shafts for connecting the rotor of said first dynamo electric machine to the pitch changing mechanism to bring about pitch changes, clutch means for causing rotation of said rotor with the propeller hub to operate said first machine as a generator, a fixed gear on the aircraft, means mounting one element of said second dynamo electric machine for rotation with the propeller hub, and second drive means comprising a plurality of drive shafts for said second machine symmetrically disposed with respect to the axis of rotation of the propeller and extending in an axial direction in the hub, said last mentioned drive shafts being rotatable by movement with the hub about said fixed gear for driving the other element of said second machine relatively to the first element to generate electricity.

4. Electrical equipment for aircraft as set forth in claim 3, in which each drive shaft for said second machine has a gear on each of its ends, the rear one of which gears engages said fixed gear, the field coil of said second machine being mounted for rotation with the propeller hub, the armature of said second machine being coaxially and rotatably mounted on the hub, and a gear mounted for rotation as one with the armature and engaging the gear on the forward end of each drive shaft for the second machine.

5. Electrical equipment for aircraft as set forth in claim 3, in which each drive shaft for said second machine has a gear on each of its ends, the rear one of which gears engages said fixed gear, the field coil of said second machine being mounted for rotation with the propeller hub, the armature of said second machine being coaxially and rotatably mounted on the hub, and a gear mounted for rotation as one with the armature and engaging the gear on the forward end of each drive shaft for the second machine, said fixed gear being of larger diameter than the gear mounted for rotation with the armature of the second machine, whereby said armature of the second machine is rotated oppositely to the rotation of the field coil of the second machine to give a high speed of relative movement between the two.

6. Electrical equipment for aircraft as set forth in claim 3, means including an armature spindle mounting the armature of the second machine rotatably and coaxially on the hub, a pinion gear on each of said drive shafts for the second machine, a sun gear engaging said pinions and rotatable with said armature, and an arrangement permitting use of said second dynamo electric machine as a starter, said arrangement comprising a clutch between the armature of the second machine and its sun wheel, said clutch including mechanically operated means for coupling the armature with its sun wheel and electrically operable means for declutching the armature therefrom, a unidirectional device drivably connected with said sun gear, and a double epi-cyclic gear device drivably connecting said unidirectional device and the armature spindle, whereby disengagement of the clutch of said second machine and energization of said second machine as a motor drives said sun wheel through the medium of said spindle, said double-epicyclic gear device, and said unidirectional device.

7. Electrical equipment for aircraft having rotatable propeller blades mounted in a hub and equipped with pitch changing mechanism which includes a pitch changing worm gear tangentially positioned with relation to each blade root with the axis of each worm gear extending parallel to the axis of rotation of the propeller, comprising, a dynamo electric machine positioned at the rear of the propeller hub and having a rotor and a stator coaxially positioned with regard to the axis of rotation of the propeller, a pinion gear attached to the forward end of each worm gear, drive means extending coaxially through the center of one of said worm gears, gearing connecting the rotor with the rear end of each of said drive shafts, and gearing including a planetary gear arrangement positioned forwardly of the propeller and coaxially about the axis of rotation of the propeller and drivably connecting each drive shaft with the pinion gear on the forward end of each worm gear, whereby energization of said dynamo electric machine drives said pitch changing worm gears through drive shafts passing through said worm gears.

8. Electrical equipment for aircraft, as set forth in claim 7, and clutch means for causing rotation of said rotor with the propeller hub to operate said dynamo electric machine as a generator when pitch changes are not required.

ARCHIBALD GRAHAM FORSYTH.

REFERENCES CITED

The following references are of record in the file of this patent:

UNITED STATES PATENTS

| Number | Name | Date |
|---|---|---|
| 1,132,368 | Lorenc et al. | Mar. 16, 1915 |
| 1,396,004 | Apple | Nov. 8, 1921 |
| 1,501,520 | Chryst | July 15, 1924 |
| 1,815,341 | Zaharoff | July 21, 1931 |

FOREIGN PATENTS

| Number | Country | Date |
|---|---|---|
| 16,992 | Great Britain | July 22, 1912 |
| 293,505 | Great Britain | July 12, 1928 |
| 340,916 | Great Britain | Jan. 8, 1931 |